(12) United States Patent
Molnar

(10) Patent No.: US 7,848,390 B2
(45) Date of Patent: Dec. 7, 2010

(54) REDUCED LATTICE DEMODULATION METHOD AND APPARATUS

(75) Inventor: Karl Molnar, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 768 days.

(21) Appl. No.: 11/760,285

(22) Filed: Jun. 8, 2007

(65) Prior Publication Data

US 2008/0304586 A1 Dec. 11, 2008

(51) Int. Cl.
*H04B 1/00* (2006.01)
(52) U.S. Cl. ...................... 375/148; 375/348
(58) Field of Classification Search .............. 375/130, 375/140–145, 147–153
See application file for complete search history.

(56) References Cited

U.S. PATENT DOCUMENTS

| | | | |
|---|---|---|---|
| 6,724,843 B1 * | 4/2004 | Clarkson et al. ............ | 375/347 |
| 2006/0029124 A1 | 2/2006 | Grant et al. | |
| 2006/0176971 A1 * | 8/2006 | Nissani (Nissensohn) ... | 375/267 |
| 2007/0047629 A1 | 3/2007 | Fulghum | |
| 2008/0019262 A1 * | 1/2008 | Lillie et al. ................. | 370/208 |

FOREIGN PATENT DOCUMENTS

GB       2429884 A      3/2007

OTHER PUBLICATIONS

Yao, Huan, "Efficient Signal, Code and Receiver Designs for MIMO Communication Systems", Jun. 2003, MIT, accessed Jul. 31, 2010.*
Agrell, E. et al. "Closest Point Search in Lattices." IEEE Transactions on Information Theory, vol. 48, No. 8, Aug. 2002, pp. 2201-2214.
Berenguer, I. et al. "Lattice-Reduction-Aided Receivers for MIMO-OFDM in Spatial Multiplexing Systems." 15th IEEE International Symoposium on Personal, Indoor and Mobile Radio Communications, 2004 (PIMRC 2004), vol. 2, Sep. 5-8, 2004, pp. 1517-1521.
Berenguer, Inaki et al. "MIMO Antenna Selection with Lattice-Reductin-Aided Linear Receivers." IEEE Transactions on Vehicular Technology, vol. 53, No. 5, Sep. 2004, pp. 1289-1302.
Grant, Stephen J. et al. "Generalized RAKE Receivers for MIMO Systems." Proc. 58th IEEE Vehicular Technology Conference, Orlando, FL, Oct. 2003, pp. 424-428.
Grant, Stephen J. et al. "Reduced Complexity Joint Detection Generalized RAKE Receiver for WCDMA MIMO Systems." Proc. 62nd IEEE Vehicular Technology Conf., Stockholm, Sweden, May 2005.
Lenstra, A. K. et al. "Factoring Polynomials with Rational Coefficients." Mathematische Annalen 261 (1982), pp. 515-534.
Co-pending U.S. Appl. No. 11/438,921, filed May 23, 2006.

* cited by examiner

*Primary Examiner*—Shuwang Liu
*Assistant Examiner*—David Huang
(74) *Attorney, Agent, or Firm*—Coats & Bennett, P.L.L.C.

(57) ABSTRACT

RAKE-based receivers utilize lattice reduction for improving symbol estimation accuracy. Channel response estimates and received signal streams are transformed from a constellation lattice basis to an integer lattice basis to increase the orthogonality of symbol estimation decision regions. In one embodiment, received signal streams are processed by generating despread signal samples from received signal streams transmitted using different spreading codes. Channel response associated with the different received signal streams is estimated and transformed from a first lattice basis to a second lattice basis having greater orthogonality between decision regions than the first lattice basis. The despread signal samples are aligned to the second lattice and combining weights generated based on the transformed channel response estimate. Symbol estimation decision statistics are generated based on the combining weights and the aligned despread signal samples. Soft bit values are generated for decoding based on the symbol estimation decision statistics.

22 Claims, 5 Drawing Sheets

REDUCED LATTICE DEMODULATION METHOD AND APPARATUS

BACKGROUND

The present invention generally relates to received signal processing in a wireless communication system, and particularly relates to processing received signals based on a reduced-lattice approach.

In a multi-antenna wireless communication system, multiple data streams are transmitted from antennas at one base station to the receiving antennas at a mobile terminal. Multiple data channels established between the mobile terminal and base station carry the data streams. Various kinds of linear receivers are used to process signals received in a multi-antenna system (also referred to as a multiple-input, multiple-output or 'MIMO' system). Some linear receivers cancel interference as part of received signal processing, thus improving overall receiver performance. One such linear receiver is a Generalized RAKE (GRAKE) receiver. GRAKE receivers generally cancel intra-cell and other-cell interference components. Interference is cancelled by constructing an impairment covariance matrix which is used during received signal processing to mitigate second-order statistics such as spatial signature across multiple receive antennas. A Minimum Mean-Square Error (MMSE) GRAKE receiver can detect one stream while cancelling interference from other transmitted streams by including the spatial channel of the interfering streams in the impairment covariance estimate.

Linear receivers detect one signal stream at a time while treating other signal streams as interference. However, when multiple streams are used to transmit data, the interfering streams can be considered as data and not just interference. Accordingly, each stream may be jointly detected instead of detecting each stream separately while treating the other streams as interference. Joint-detection receivers provide improved performance, but have increased complexity. An example of a joint-detection receiver is a joint-detection GRAKE (JD-GRAKE) receiver.

The JD-GRAKE receiver generates an impairment covariance estimate which does not include contributions from other transmitted data streams (covariance). Symbol estimation decision statistics are generated after correlation and matched filtering by the receiver's RAKE fingers. The decision statistics are used to form detected soft-values from joint symbol hypotheses generated across the multiple transmitted streams. Each transmitted stream comprises sets of consecutive bits mapped to symbols, sometimes considered to be complex symbols having a real part and an imaginary part.

Symbol values are selected from a symbol constellation (or signal constellation), which is a representation of the relationship between each symbol available for a particular modulation scheme and a corresponding sequence of bits. The symbol constellation may be viewed as a lattice, where the symbols are plotted as points in a two-dimensional space. For example, quadrature phase shift keying (QPSK) modulation results in a symbol constellation lattice where the bit sequence 00 is mapped to the symbol $\sqrt{P}+0j$, the bit sequence 01 is mapped to the symbol $0+j\sqrt{P}$, and so on, where P is the power used by the digital communication system in transmitting a symbol. The joint symbol hypotheses formulated in non-linear receivers increase exponentially in complexity as symbol constellation size and number of transmitted streams increase. For example, $64^4$ possible combinations of symbols can be transmitted when four streams of symbols are transmitted using the 64-Quadrature Amplitude Modulation (64-QAM) scheme.

Ideally, a receiver deployed in a multi-antenna environment would have the low complexity of a linear receiver, but provide the performance of a non-linear receiver. One approach that improves linear receiver performance without increasing complexity is based on lattice reduction. Lattice reduction involves determining an alternate representation of the channel response (H) and transmitted symbols (x) as given by:

$$y = Hx + w = (HP)(P^{-1}x) + w = H'z + w \quad (1)$$

where y represents a received signal stream, w represents Additive White Gaussian Noise (AWGN), and P represents a basis-change matrix.

The channel response and received signal stream are transformed from a constellation lattice basis corresponding to the original modulation scheme to a reduced lattice basis having integer (possibly complex) spacing where the matrix P in equation (1) provides the lattice transformation. The channel response vectors are conventionally non-orthogonal when expressed using a constellation lattice, and thus cause increased symbol estimation error when noise and interference are present because the decision regions are less robust. The slightest amount of noise or interference may result in symbol estimation error. The lattice transformation provides greater orthogonality between channel response vectors when expressed using the integer lattice. Thus, symbol estimation accuracy is improved in the presence of noise and interference. The reduced-lattice approach has been applied to limited types of receivers such as the Inverse Channel Detection (ICD) receiver and Bell Labs' BLAST receiver.

It is desirable to extend the reduced lattice approach to multi-antenna systems such as those compatible with the High-Speed Downlink Packet-Data Access (HSDPA) mode of WCDMA. However, multi-antenna systems introduce several complexities that must be addressed before successfully implementing lattice reduction in a multi-antenna environment. First, multiple transmitted signal streams modulated using different spreading codes are targeted to the same receiving device in multi-antenna systems. Moreover, same-cell interference from other signals transmitted by the same base station may be present. Other-cell interference generated by neighboring base stations may also be present. Further, advanced multi-antenna systems demand higher receiver performance than what is provided by conventional linear receivers.

SUMMARY

According to the methods and apparatus taught herein, lattice reduction is applied to RAKE-based receivers deployed in multi-antenna wireless communication systems. The RAKE-based receivers transform channel response estimates and received signal streams from a constellation lattice to an integer lattice, thereby increasing the orthogonality between symbol estimation regions. Symbol estimation accuracy increases in the presence of noise and interference when the symbol estimation regions are more orthogonal. Lattice reduction is applied to both GRAKE and zero-forcing RAKE-based receivers herein.

According to one embodiment, received signal streams are processed by generating despread signal samples from received signal streams transmitted using different spreading codes. Channel response associated with the different received signal streams is estimated and transformed from a first lattice basis to a second lattice basis having greater orthogonality between decision regions than the first lattice basis. The despread signal samples are aligned to the second lattice and combining weights generated based on the transformed channel response estimate. Symbol estimation decision statistics are generated based on the combining weights and the aligned despread signal samples. Soft bit values are generated for decoding based on the symbol estimation decision statistics.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
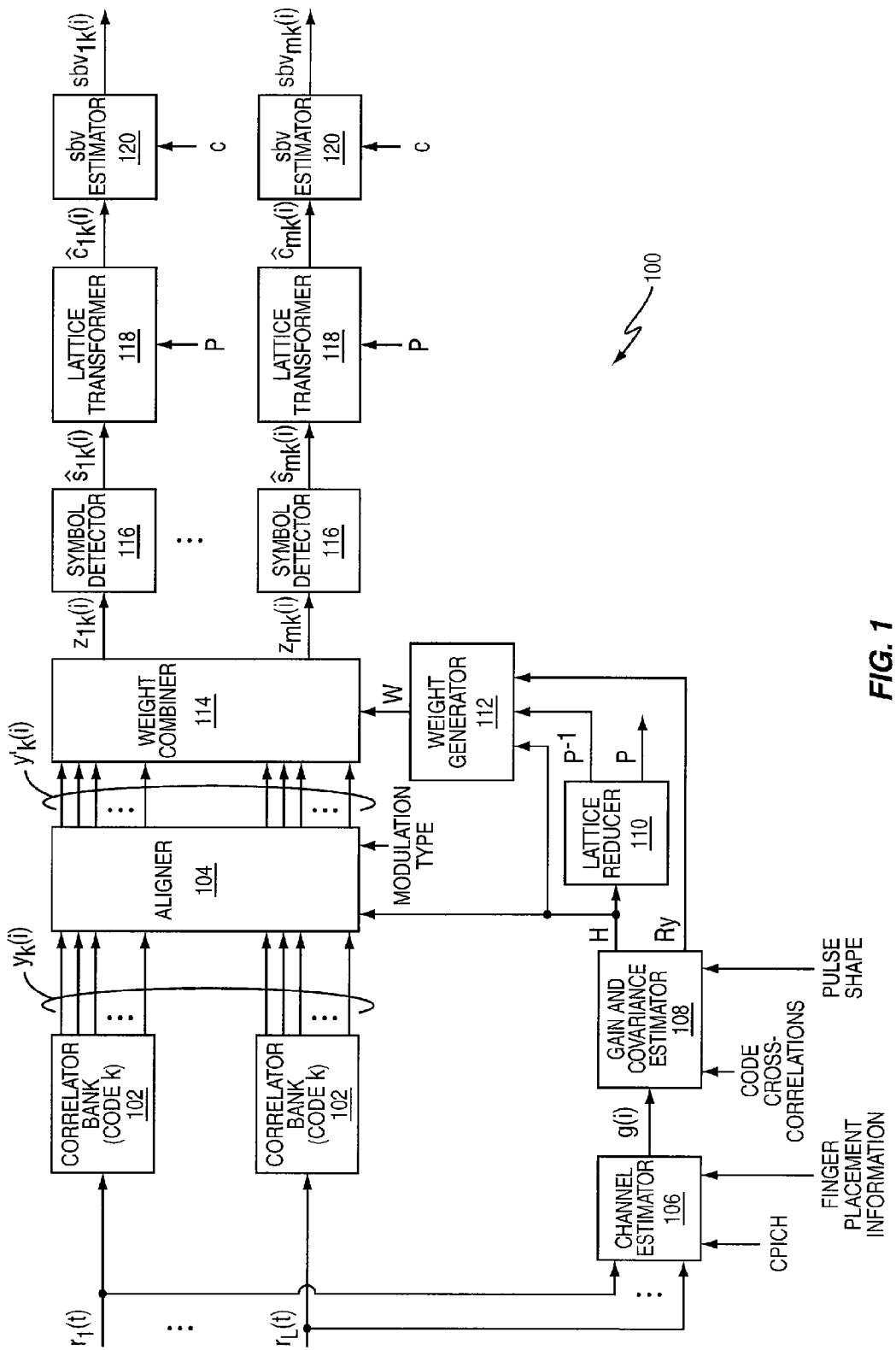
FIG. 1 is a block diagram of an embodiment of a GRAKE receiver that implements lattice reduction.

FIG. 1 illustrates an embodiment of a baseband processor 100 for use in a GRAKE receiver (not shown). The GRAKE baseband processor 100 uses lattice reduction to improve symbol estimation accuracy. Received signals $r_1(t)$ through $r_L(t)$ are received from multipath fading channels at L receive antennas (not shown), where M signal streams are transmitted to the receiver. The received signals are passed through correlator banks 102 for a specific spreading code k. The correlator banks 102 include F RAKE fingers per receive antenna and produce a composite despread signal $y_k(i)$ which represents a vector of samples derived across the RAKE fingers and receive antennas, e.g., as illustrated by Step 200 of FIG. 2.

GRAKE combining weights are eventually generated based on the despread signal samples and a channel response estimate generated by the GRAKE baseband processor 100. However, the combining weights are not directly computed from the despread signal samples and the channel response estimate. Instead, the despread signal samples are aligned to a new integer lattice and the channel response estimate is transformed from the constellation lattice associated with the transmitted symbols to the new lattice before the combining weights are computed. The decision regions associated with the new integer lattice are more orthogonal than the decision regions of the constellation lattice, thus improving symbol estimation accuracy in the presence of noise and interference.

Figure 2:
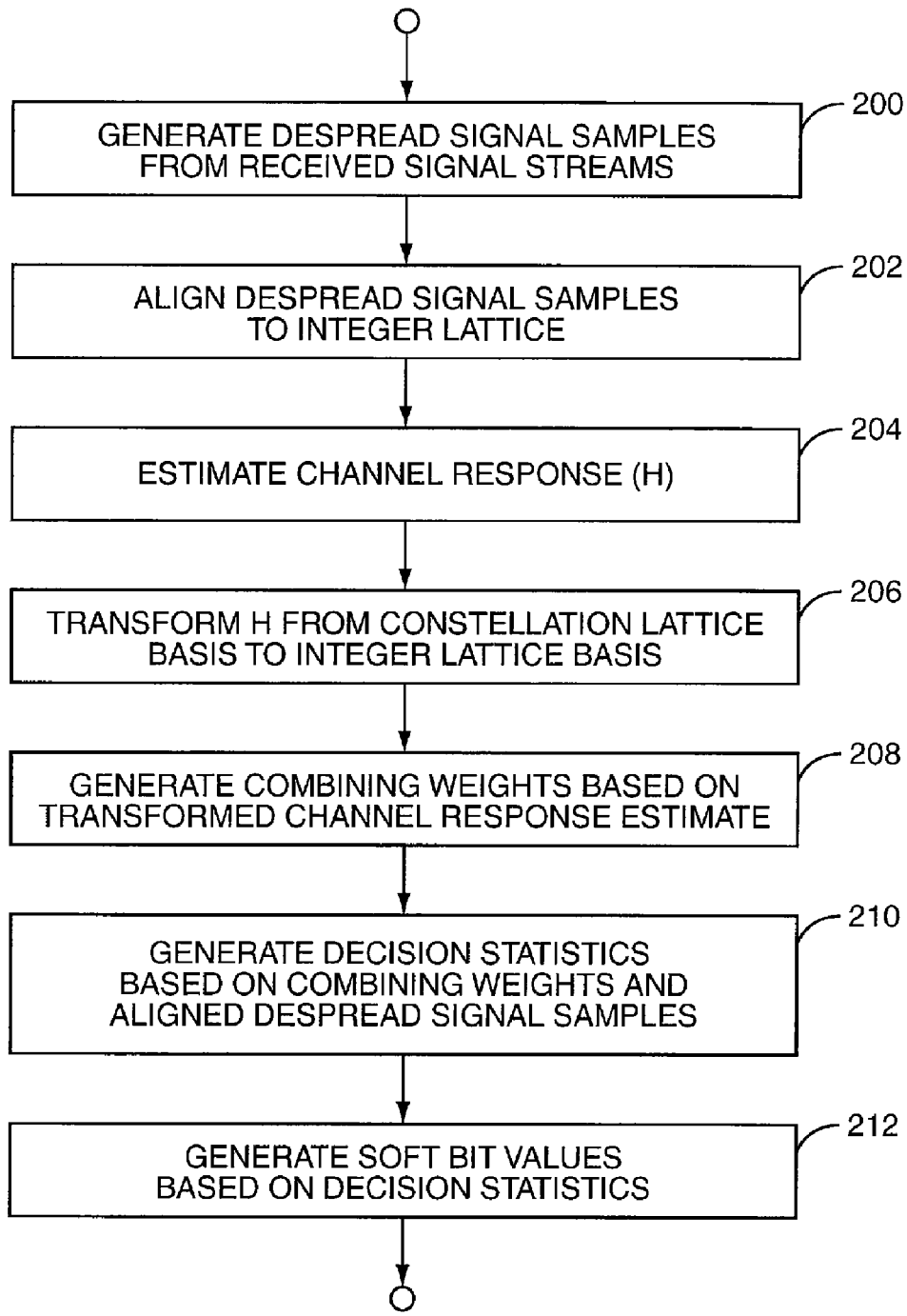
FIG. 2 illustrates an embodiment of lattice reduction processing logic.

To this end, the GRAKE baseband processor 100 includes an aligner 104 for aligning the despread signal samples $y_k(i)$ to the new integer lattice, e.g., as illustrated by Step 202 of FIG. 2. The despread signal samples are aligned to the new integer lattice because many modulation schemes such as QAM neither consist of contiguous integers nor contain the origin. Accordingly, the despread signal samples are shifted and scaled so that lattice reduction can be properly carried out by the GRAKE baseband processor 100. In one embodiment, the aligner 104 shifts and scales the despread signal samples as given by:

$$y'_k(i) = \frac{1}{2}(y_k(i) + \alpha H d) \qquad (2)$$

where $y'_k(i)$ represents the despread signal samples scaled by ½ and shifted by $\alpha$ and d. The terms $\alpha$ and d depend on the particular modulation scheme as is well known in the art.

The GRAKE baseband processor 100 also includes a channel estimator 106 for deriving an estimate of the medium impulse response g(i) between each transmit and receive antenna/finger pair. The medium impulse response estimate is derived from the received signal streams using common pilot channels (e.g., CPICH) and RAKE finger placement information such as delays as is well known in the art. A gain and covariance estimator 108 then determines the net channel response matrix H and a data covariance matrix $R_y$ based at least on the medium impulse response as is well known in the art, e.g., as illustrated by Step 204 of FIG. 2.

A lattice reducer 110 transforms the net channel response matrix H from the constellation lattice to an integer lattice having decision regions more orthogonal than those of the constellation lattice, e.g., as illustrated by Step 206 of FIG. 2. In one embodiment, the new integer lattice has complex integer spacing. Regardless, symbol estimation accuracy is improved in the presence of noise and interference because the decision regions associated with the new integer matrix are more robust than the decision regions associated with the constellation lattice.

In one embodiment, the lattice reducer 110 transforms the constellation basis represented by the column vectors of the net channel response matrix H to an integer basis having decision regions with improved orthogonality. To this end, the lattice reducer 110 assumes that the transmitted symbols are located on an integer lattice instead of the actual constellation lattice. The lattice reducer 110 may implement any suitable lattice basis reduction algorithm such as Lenstra, Lenstra, and Lovasv (LLL), Korkin-Zolotarev (KZ), Minkowski, Seysen or the like. For ease of description only, the LLL lattice basis reduction algorithm is used herein.

The LLL lattice basis reduction transformation of the net channel response matrix H results in an integer matrix P and its inverse $P^{-1}$ such that the despread signal samples $y_k(i)$ may be expressed as:

$$y_k(i) = HPP^{-1}c_k(i) + x(i) \qquad (3)$$

where $c_k(i)$ represents possible transmitted symbols for the $k^{th}$ spreading code. Let G=HP and $s_k(i)=P^{-1}c_k(i)$, thus providing a new representation of the despread signal samples as given by:

$$y_k(i) = Gs_k(i) + x(i) \qquad (4)$$

A weight generator 112 computes GRAKE combining weights for the symbols $s_k(i)$ in the new integer lattice basis given by the columns of G, e.g., as illustrated by Step 208 of FIG. 2. The combining weights are generated by solving for W in:

$$E\{y_k(i)y_k^H(i)\}W = E\{y_k(i)s_k^H(i)\} \qquad (5)$$

The term $E\{y_k(i)y_k^H(i)\}$ on the left hand side of equation (5) corresponds to the data covariance matrix $R_y$ generated by the gain and covariance estimator 108. Notably, the data covariance matrix is unaffected by the lattice transformation, and thus does not require modification. However, the term on the right hand side of equation (5) becomes:

$$E\{y_k(i)s_k^H(i)\} = E\{Gs_k(i)s_k^H(i)\} \quad (6)$$
$$= HP^{-H}$$

Thus, GRAKE combining weights are generated by solving for W as given by:

$$R_y W = HP^{-H} \quad (7)$$

In another embodiment, Maximum Likelihood (ML) GRAKE combining weights can be generated using an estimate of impairment covariance. For stream m, the ML GRAKE weights are given by:

$$R_u w_{ML,m} = h_m P^{-H} \quad (8)$$

where $h_m$ is the $m^{th}$ column of H corresponding to the channel response from the $m^{th}$ stream, $R_u$ is the impairment covariance matrix, and $w_{ML,m}$ is the ML GRAKE weight for stream m. The impairment covariance matrix is found by $E\{(y_k(i)-h_m c_k(i))(y_k(i)-h_m c_k(i))^H\}$ and can be constructed parametrically or non-parametrically via the data covariance matrix. The ML GRAKE weights $W_{ML,m}$ are related to the $m^{th}$ column of the matrix W above by a scaling factor.

A weight combiner 114 generates symbol estimation decision statistics $z_{mk}(i)$ based on the aligned despread signal samples $y'_k(i)$ and the combining weights W, e.g., as illustrated by Step 210 of FIG. 2. Because the combining weights are generated based on the integer matrix P, the corresponding decision statistics are located on the integer lattice for each transmit stream M and not the original constellation lattice. This way, symbol estimation is performed by identifying symbols located on the integer lattice instead of the reduced-orthogonality constellation lattice.

A symbol detector 116 such as a slicer quantizes each decision statistic to the nearest symbol located on the integer lattice. In one embodiment, the symbol detector 116 identifies symbols located on the integer lattice nearest the decision statistics and neighbor lattice points. This way, computational efficiency is increased by limiting soft bit value generation based on the distance between identified symbols $\hat{s}_k(i)$ and neighboring lattice points, not every possible point on the integer lattice. Regardless, soft bit values are subsequently generated based on the identified symbols, e.g., as illustrated by Step 212 of FIG. 2.

In one embodiment, a lattice transformer 118 transforms the column vectors of the identified symbols $\hat{s}_k(i)$ from the integer lattice basis to the constellation lattice basis based on the integer matrix P. A soft bit value estimator 120 then generates soft bit values $sbv_k(i)$ from the transformed symbols $\hat{c}_k(i)$. In another embodiment, the soft bit estimator 120 generates the soft bit values before the identified symbols are transformed to the constellation lattice. Accordingly, the soft bit values are subsequently mapped to the corresponding symbols in the original constellation lattice based on the integer matrix P. Either way, detection accuracy is improved by identifying symbols on an integer lattice having increased orthogonality between decision regions.

Figure 3:
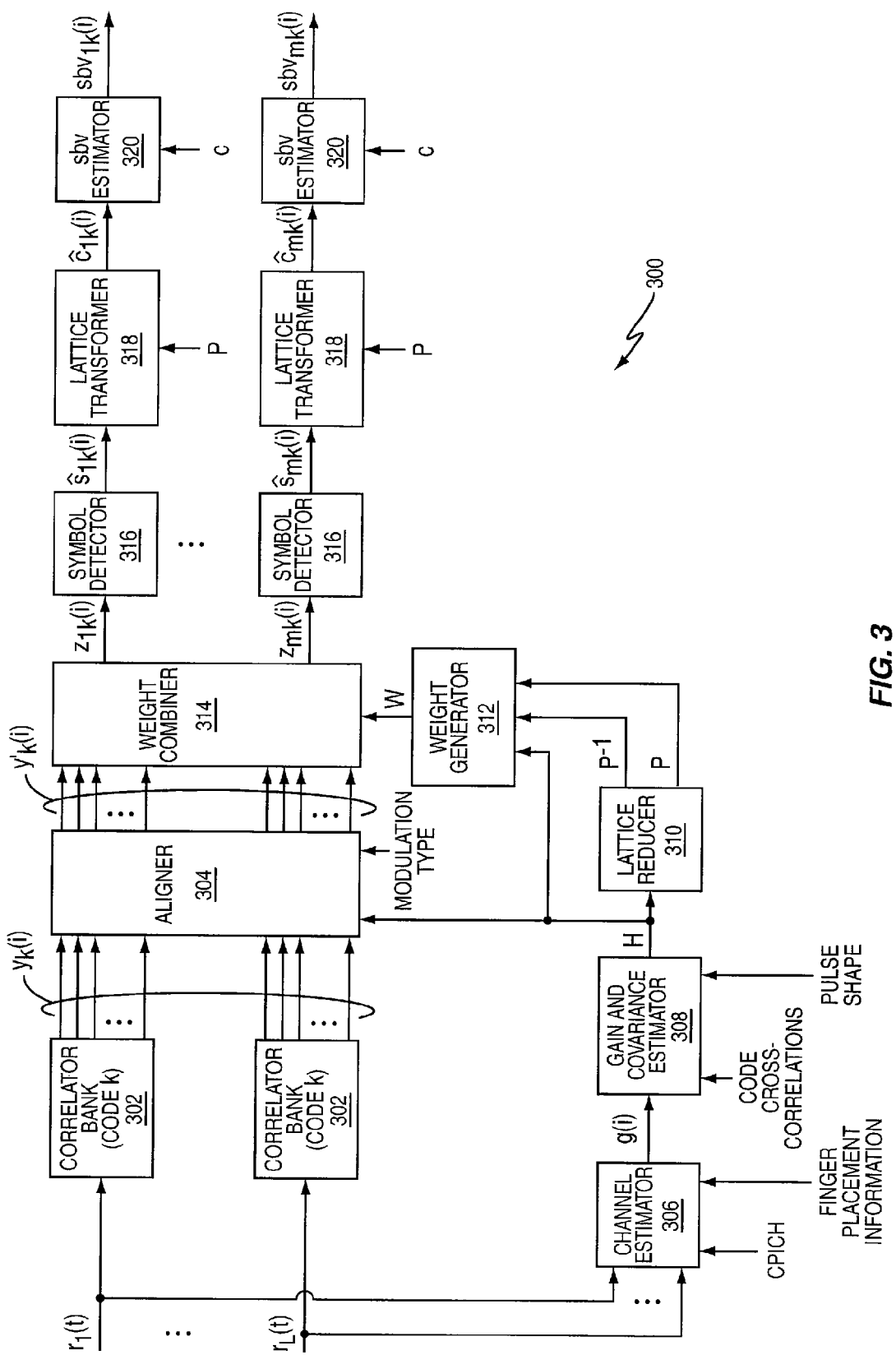
FIG. 3 is a block diagram of an embodiment of a zero-forcing RAKE-based receiver that implements lattice reduction.

FIG. 3 illustrates an embodiment of a baseband processor 300 for use in a Zero-Forcing (ZF) RAKE-based receiver (not shown) that employs lattice reduction for improving symbol estimation accuracy. The ZF-RAKE baseband processor 300 functions much the same way as the GRAKE baseband processor 100 of FIG. 1, except the ZF-RAKE baseband processor 300 does not account for signal interference (except for between transmitted streams). Thus, the ZF-RAKE baseband processor 300 does not generate a data covariance matrix $R_y$. The ZF-RAKE baseband processor 300 includes an aligner 302 for aligning the despread signal samples to an integer lattice. The ZF-RAKE baseband processor 300 also includes correlator banks 304 for generating a despread signal $y_k(i)$ and a channel estimator 306 for estimating medium impulse response g(i). A gain estimator 308 determines the net channel response matrix H based on the medium impulse response estimate. The channel response estimate is transformed from the constellation lattice to the integer lattice before RAKE combining weights are computed, thus improving symbol estimation accuracy.

To this end, a lattice reducer 310 transforms the constellation basis formed by the columns of the net channel response matrix H to an integer basis having improved orthogonality also as previously described. In this embodiment, the combining weights generated by a weight generator 312 are not based on a data covariance matrix. Instead, the combining weights are based only on the net channel response matrix H and the integer matrix P as given by:

$$W = (G^H G)^{-1} G \quad (9)$$
$$= P^{-1}(H^H H)^{-1} P^{-H} HP$$

A weight combiner 314 generates symbol estimation decision statistics $z_{mk}(i)$ based on the aligned despread signal samples $y'_k(i)$ and the combining weights. A symbol detector 316 such as a slicer quantizes each decision statistic to the nearest symbol located on the integer lattice. In one embodiment, the lattice transformer 318 transforms identified symbols to the constellation matrix based on the integer matrix P before a soft bit value estimator 320 processes the identified symbols as previously described. In another embodiment, the soft bit value estimator 320 generates soft bit values and the then the soft bit values are mapped to the constellation lattice also as previously described.

Detection efficiency may be further increased by limiting quantization of the decision statistics to points on the integer lattice corresponding to only valid constellation symbols. Symbols are transmitted using a known modulation scheme. The transmitted symbols are located on a constellation lattice associated with the modulation scheme. The constellation lattice has a finite number of points each representing a valid symbol. Valid constellation symbols may be determined by a receiver since the modulation scheme is known. Accordingly, the baseband processors 100, 300 disclosed herein may restrict the integer lattice to points corresponding to valid constellation symbols. That is, points on the constellation lattice representing valid symbols are mapped to the integer lattice based on the transformation techniques disclosed herein. Quantization of the decision statistics may then be restricted to the points on the integer lattice corresponding to valid constellation symbols since all other integer lattice points do not represent valid symbols.

Figure 4:
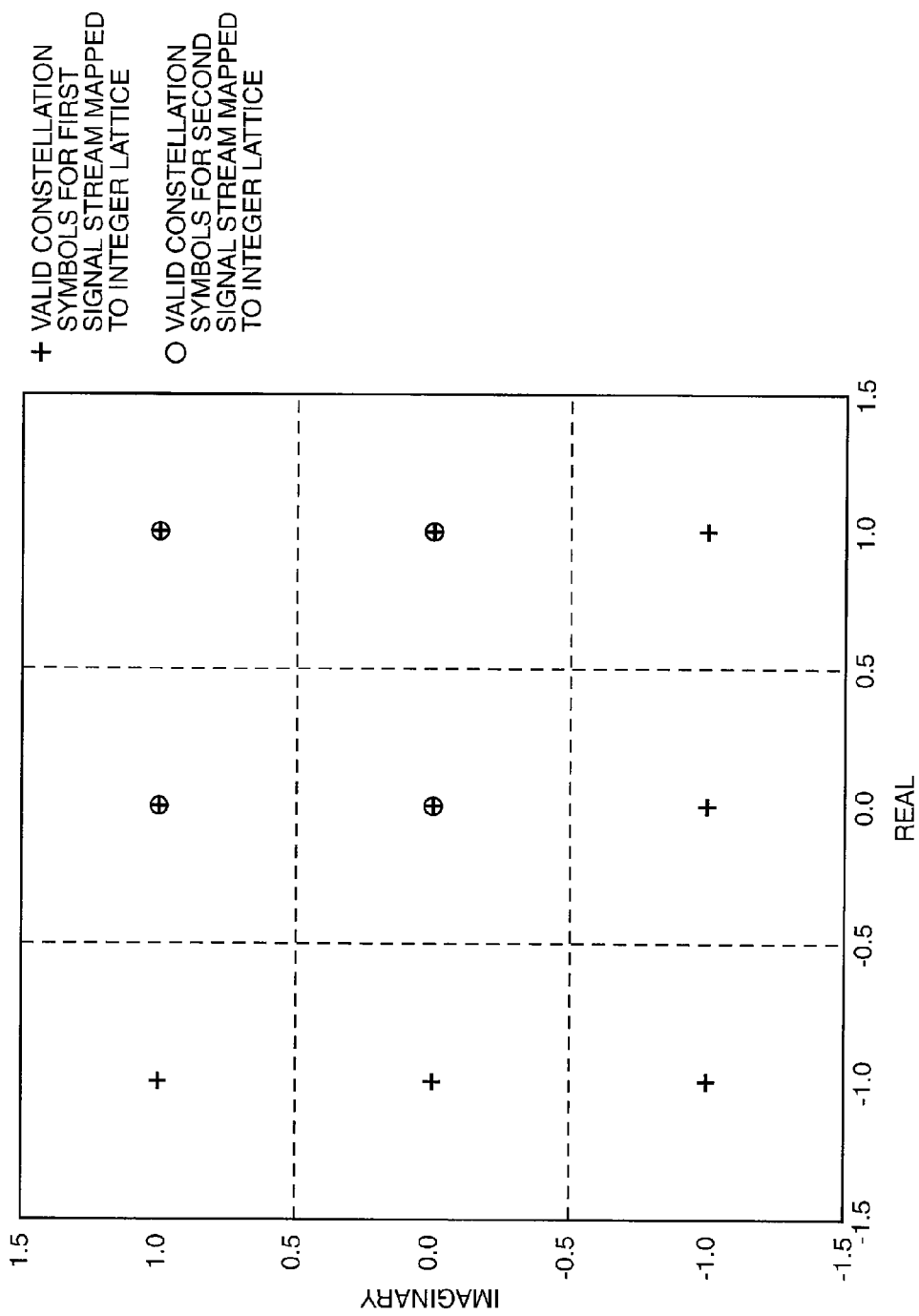
FIG. 4 illustrates a plot diagram of an embodiment of a restricted integer lattice having points corresponding only to valid constellation symbols.

FIG. 4 illustrates an exemplary restricted integer lattice having points corresponding only to valid constellation symbols associated with exemplary first and second signal streams. In this example, nine points located on the restricted lattice correspond to nine valid constellation symbols associated with the first signal stream. Similarly, four points located on the restricted lattice correspond to four valid constellation symbols associated with the second signal stream. Quantization of the decision statistics derived for the first and second signal streams may be restricted to the integer lattice points corresponding to the valid constellation symbols for the first and second streams. This way, symbol estimation efficiency is increased by limiting quantization of the decision statistics to points on the integer lattice which represent valid symbols.

Figure 5:
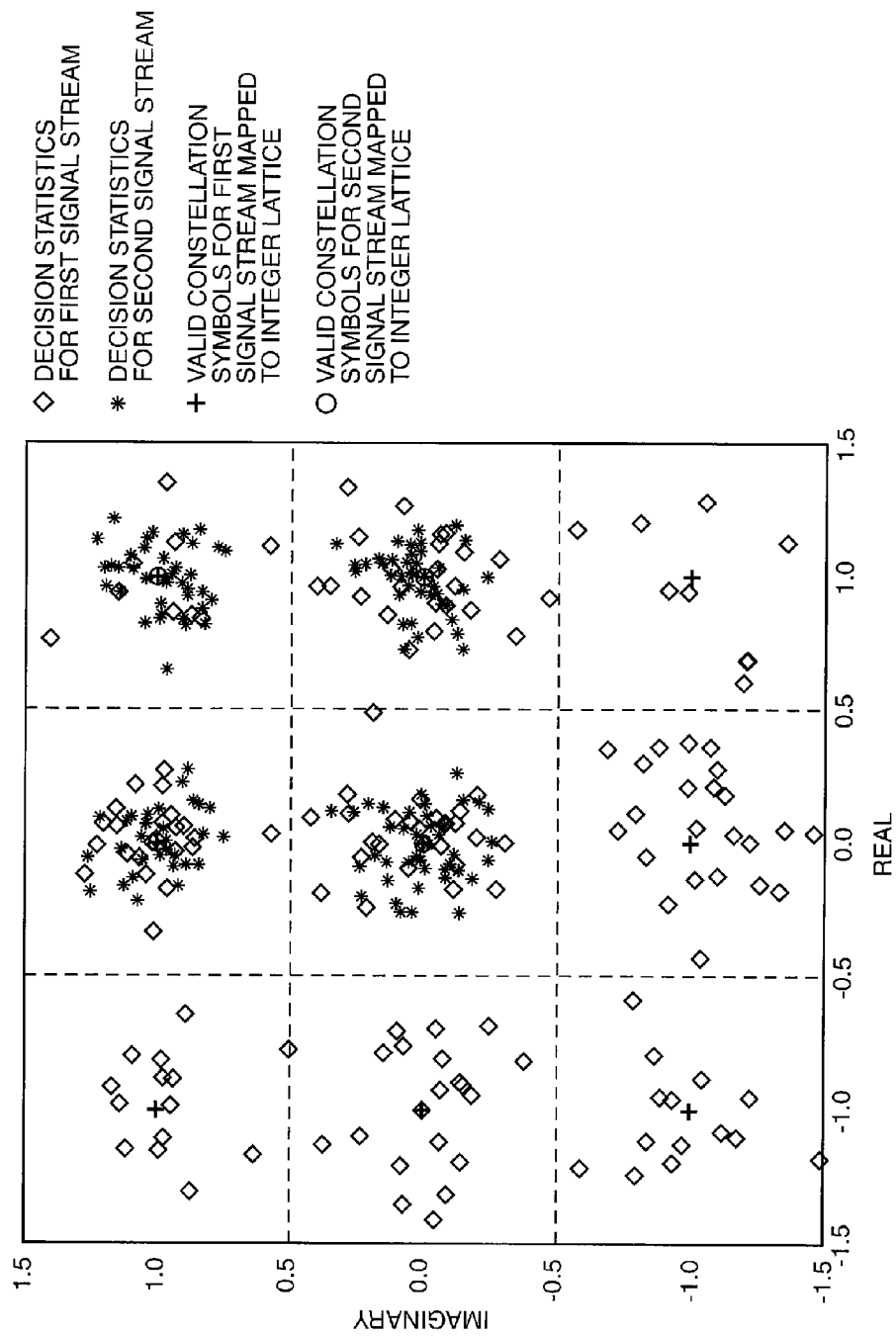
FIG. 5 illustrates a plot diagram of an embodiment of decision statistics quantized to the restricted integer lattice of FIG. 4.

FIG. 5 illustrates the restricted integer lattice of FIG. 4 after the decision statistics derived for the first and second signal streams have been mapped to the lattice. Symbol estimation based on the decision statistics is restricted to the lattice points corresponding to the valid constellation symbols of the first and second signal streams. In one embodiment, symbol estimation is performed individually for each signal stream. For example, symbol estimation is limited to the nine identified lattice points for the first signal stream and to the four identified lattice points for the second stream. Accordingly, symbol estimation for the second signal stream is not based on the five lattice points corresponding to the constellation symbols which are valid only for the first signal stream.

In another embodiment, symbol estimation is performed jointly for all received signal streams. That is, symbol estimation is restricted to a superset of integer lattice points corresponding to the valid constellation symbols for all received signal streams. This way, symbol estimation is performed for each received signal stream based on the same number of restricted integer lattice points. In the present example, symbol estimation is restricted to a superset of nine integer lattice points for both received signal streams. The nine lattice points correspond to the valid constellation symbols for both the first and second received signal streams.

According to either the individual or joint estimation embodiments, soft bit values are generated based on the symbols identified using a restricted integer lattice only having points corresponding to valid constellation symbols. The distance between each identified integer lattice point (i.e., symbol) and neighboring lattice points is determined. This way, soft bit value determination is restricted not only to neighboring points on the integer lattice, but neighboring points which correspond to valid constellation symbols. In FIG. 5 for example, the distance between the decisions statistics that fall near the identified symbol associated with lattice point $$\begin{bmatrix} 1 \\ 0 \end{bmatrix}$$

and the neighboring points $$\begin{bmatrix} 1 \\ 1 \end{bmatrix}, \begin{bmatrix} 1 \\ -1 \end{bmatrix}, \text{ and } \begin{bmatrix} 0 \\ 0 \end{bmatrix}$$

is determined to resolve whether the identified symbol is the actual transmitted symbol.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of received signal processing, comprising:
    generating despread signal samples from received signal streams transmitted using different spreading codes;
    estimating channel response associated with the different received signal streams;
    generating a basis change matrix to provide transformation of the channel response estimate from a first lattice basis to a second lattice basis having greater orthogonality between decision regions than the first lattice basis;
    aligning the despread signal samples to the second lattice;
    generating combining weights based on the channel response estimate and a conjugate transpose of the inverse of the basis change matrix;
    generating symbol estimation decision statistics based on the combining weights and the aligned despread signal samples; and
    generating soft bit values for decoding based on the symbol estimation decision statistics.

2. The method of claim 1, comprising generating the combining weights as a function of the channel response estimate, the conjugate transpose of the inverse of the basis change matrix and a data covariance estimate derived from the received signal streams.

3. The method of claim 1, comprising generating the combining weights as a function of the channel response estimate, the conjugate transpose of the inverse of the basis change matrix and an impairment covariance estimate.

4. The method of claim 1, wherein generating the soft bit values comprises:
    identifying symbols located on the second lattice nearest the symbol estimation decision statistics; and
    generating the soft bit values based on the identified symbols.

5. The method of claim 4, wherein generating the soft bit values based on the identified symbols comprises:
    transforming the identified symbols to the first lattice; and
    generating the soft bit values from the transformed symbols.

6. The method of claim 4, wherein identifying symbols located on the second lattice nearest the symbol estimation decision statistics comprises:
    mapping valid constellation symbols located on the first lattice to the second lattice; and
    restricting quantization of the symbol estimation decision statistics to the mapped constellation symbols located on the second lattice.

7. The method of claim 6, wherein restricting quantization of the symbol estimation decision statistics to the mapped constellation symbols located on the second lattice comprises, for each received signal stream, restricting quantization of the symbol estimation decision statistics associated with the received signal stream to the mapped constellation symbols associated with the received signal stream.

8. The method of claim 6, wherein restricting quantization of the symbol estimation decision statistics to the mapped constellation symbols located on the second lattice comprises jointly restricting quantization of the symbol estimation decision statistics associated with each of the received signal streams to the mapped constellation symbols associated with the received signal streams.

9. The method of claim 1, wherein generating soft bit values based on the symbol estimation decision statistics comprises:
    identifying points located on the second lattice nearest the symbol estimation decision statistics; and determining the soft bit values based on the distance between the identified points and neighboring points located on the second lattice.

10. The method of claim 9, wherein determining the soft bit values based on the distance between the identified points and neighboring points located on the second lattice comprises determining the soft bit values based on the distance between points identified on the second lattice corresponding to valid constellation symbols and neighboring points located on the second lattice corresponding to valid constellation symbols.

11. The method of claim 1, wherein aligning the despread signal samples to the second lattice comprises shifting and scaling the despread signal samples based on the modulation scheme associated with the received signal streams.

12. A wireless receiver comprising a baseband processor configured to:
generate despread signal samples from received signal streams transmitted using different spreading codes;
estimate channel response associated with the different received signal streams;
generate a basis change matrix to provide transformation of the channel response estimate from a first lattice basis to a second lattice basis having greater orthogonality between decision regions than the first lattice basis;
align the despread signal samples to the second lattice;
generate combining weights based on the channel response estimate and a conjugate transpose of the inverse of the basis change matrix;
generate symbol estimation decision statistics based on the combining weights and the aligned despread signal samples; and
generate soft bit values for decoding based on the symbol estimation decision statistics.

13. The wireless receiver of claim 12, wherein the baseband processor is configured to generate the combining weights as a function of the channel response estimate, the conjugate transpose of the inverse of the basis change matrix and a data covariance estimate derived from the received signal streams.

14. The wireless receiver of claim 12, wherein the baseband processor is configured to generate the combining weights as a function of the channel response estimate, the conjugate transpose of the inverse of the basis change matrix and an impairment covariance estimate.

15. The wireless receiver of claim 12, wherein the baseband processor is configured to:
identify symbols located on the second lattice nearest the symbol estimation decision statistics; and
generate the soft bit values based on the identified symbols.

16. The wireless receiver of claim 15, wherein the baseband processor is configured to:
transform the identified symbols to the first lattice; and
generate the soft bit values from the transformed symbols.

17. The wireless receiver of claim 15, wherein the baseband processor is configured to:
map valid constellation symbols located on the first lattice to the second lattice; and
restrict quantization of the symbol estimation decision statistics to the mapped constellation symbols located on the second lattice.

18. The wireless receiver of claim 17, wherein for each received signal stream, the baseband processor is configured to restrict quantization of the symbol estimation decision statistics associated with the received signal stream to the mapped constellation symbols associated with the received signal stream.

19. The wireless receiver of claim 17, wherein the baseband processor is configured to jointly restrict quantization of the symbol estimation decision statistics associated with each of the received signal streams to the mapped constellation symbols associated with the received signal streams.

20. The wireless receiver of claim 12, wherein the baseband processor is configured to:
identify points located on the second lattice nearest the symbol estimation decision statistics; and
determine the soft bit values based on the distance between the identified points and neighboring points located on the second lattice.

21. The wireless receiver of claim 20, wherein the baseband processor is configured to determine the soft bit values based on the distance between points identified on the second lattice corresponding to valid constellation symbols and neighboring points located on the second lattice corresponding to valid constellation symbols.

22. The wireless receiver of claim 12, wherein the baseband processor is configured to shift and scale the despread signal samples based on the modulation scheme associated with the received signal streams.

* * * * *